Figure 1:
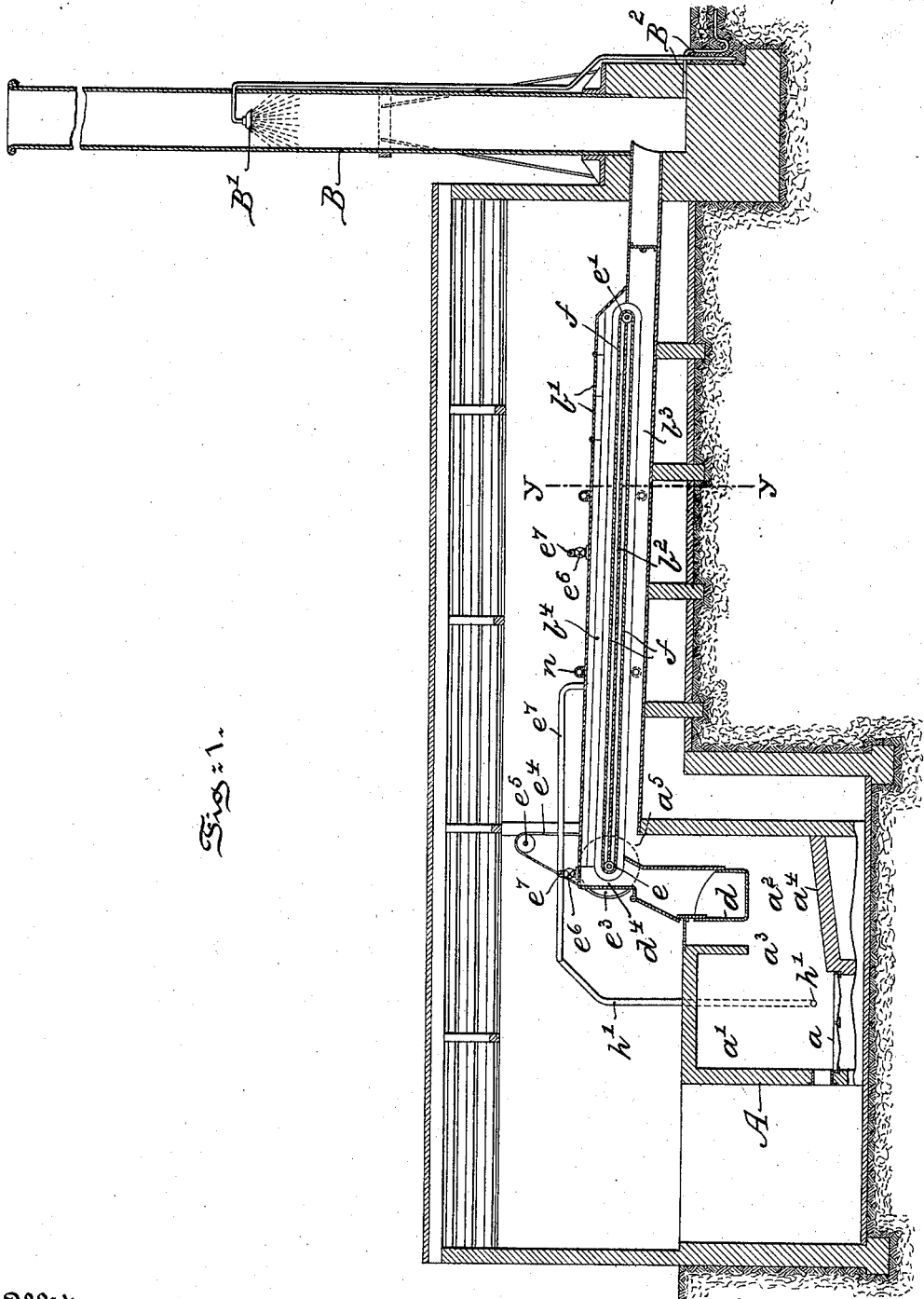

(No Model.)  3 Sheets—Sheet 1.

W. S. RICHARDSON.
APPARATUS FOR MAKING SULFATE OF AMMONIUM.

No. 598,488.  Patented Feb. 1, 1898.

Witnesses:
Thomas M. Smith
Richard C. Maxwell

Inventor:
Winfield S. Richardson,
By J. Walter Douglass
Attorney.

(No Model.) 3 Sheets—Sheet 2.

W. S. RICHARDSON.
APPARATUS FOR MAKING SULFATE OF AMMONIUM.

No. 598,488. Patented Feb. 1, 1898.

Fig. 2.

Witnesses:
Thomas M. Smith
Richard C. Maxwell

Inventor:
Winfield S. Richardson,
by J. Walter Douglass.
Attorney.

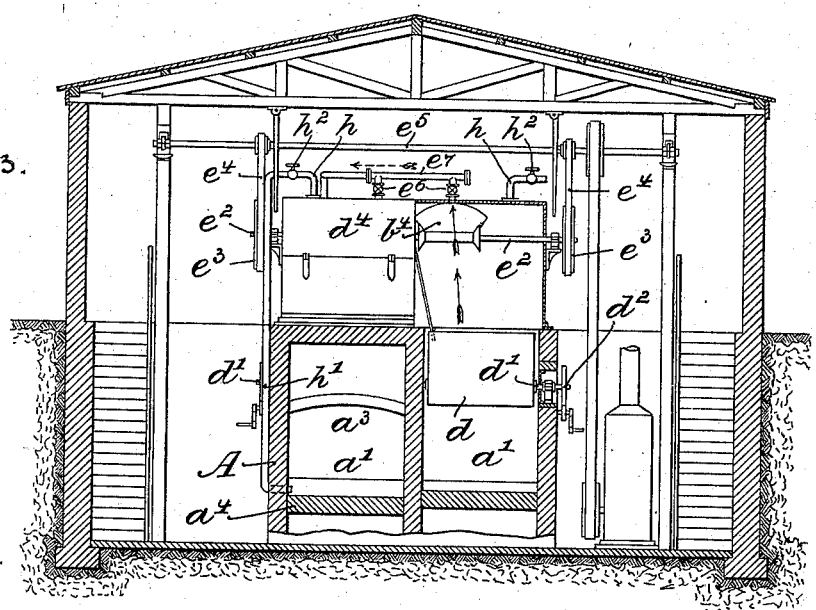
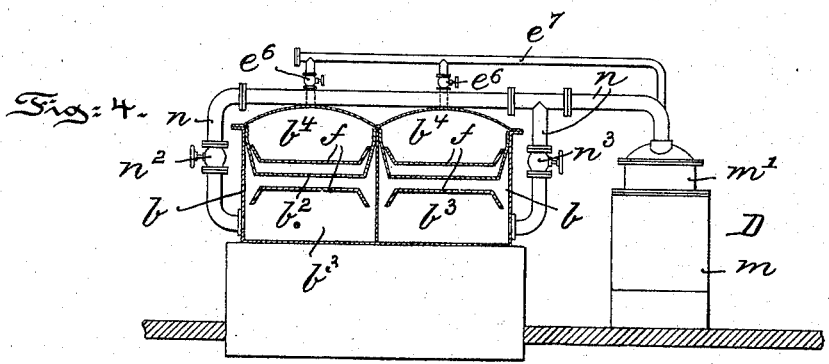
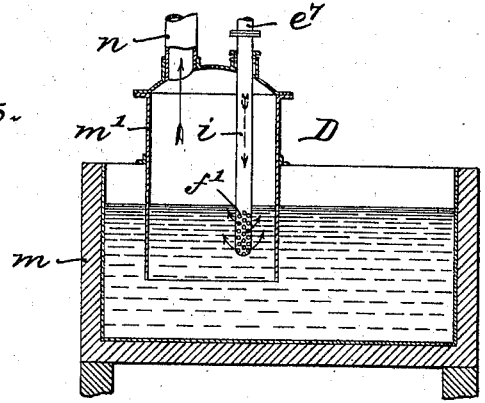

UNITED STATES PATENT OFFICE.

WINFIELD S. RICHARDSON, OF CAMDEN, NEW JERSEY, ASSIGNOR TO THE NATIONAL WASTE UTILIZATION COMPANY, OF SAME PLACE.

APPARATUS FOR MAKING SULFATE OF AMMONIUM.

SPECIFICATION forming part of Letters Patent No. 598,488, dated February 1, 1898.

Application filed February 10, 1897. Serial No. 622,739. (No model.)

*To all whom it may concern:*

Be it known that I, WINFIELD S. RICHARDSON, a citizen of the United States, residing at Camden, in the county of Camden and State of New Jersey, have invented certain new and useful Improvements in Apparatus for the Manufacture of Sulfate of Ammonia, of which the following is a specification.

My invention has relation to apparatus for the manufacture of sulfate of ammonia by dry distillation.

Hitherto the generally-practiced method of producing sulfate of ammonia was to introduce bone or animal matter into a muffle or cylinder and to connect a pipe therewith, said pipe having its open end located in a bath of water. Heat was then applied to the cylinder or muffle to drive off the ammoniacal vapors or gas into and through the water until the latter became saturated therewith and subjected them to the influence of steam, milk of lime, and sulfuric acid in substantially the same manner that gas liquor is treated to recover sulfate of ammonia therefrom.

According to my present invention by dry distillation the ammoniacal vapors or gas are or is conducted directly from the muffle or oven to a saturator containing sulfuric acid, the vapors or gas being passed directly through the acid-bath, so as to become saturated therewith. When the sulfuric acid becomes thoroughly saturated with the ammoniacal vapors or gas, the said saturated acid will separate into small white crystals, settling in the receptacle and withdrawn as sulfate of ammonia.

By the dry-distillation method above explained can be produced to a certain weight or quantity of sulfuric acid a corresponding proportion or quantity of sulfate of ammonia and in a most economical manner.

My invention, stated in general terms, consists of an apparatus for manufacturing sulfate of ammonia, as hereinafter described and claimed.

The nature and scope of my invention will be more fully understood from the following description, taken in connection with the accompanying drawings, forming part hereof, in which—

Figure 1 is a longitudinal central section of certain of the features of an apparatus embodying my invention. Fig. 2 is a top or plan view of the apparatus, partly broken away. Fig. 3 is a cross-sectional view on the line $x$ $x$ of Fig. 2. Fig. 4 is a cross-sectional view, enlarged, on the line $y$ $y$ of Fig. 1; and Fig. 5 is a longitudinal central sectional view, enlarged, of a saturator of my invention embodying, in conjunction with the furnace, the main features of the same.

Referring to the drawings, A represents a furnace of ordinary construction having a grate $a$ and a fire-chamber $a'$. Back of the chamber $a'$ is arranged a chamber $a^2$ for the reception of fuel, and this chamber $a^2$ communicates with the chamber $a$ through an opening $a^3$. The floor $a^4$ of the chamber $a^2$ is sloping or inclined and is designed to permit of the gradual movement of fuel to the fire-chamber $a'$. At the upper portion of the chamber $a^2$ is provided an opening $a^5$, communicating with a horizontally-arranged flue or oven $b$. Within the chamber $a^2$ is also located a muffle or receptacle $d$, adapted to be turned or dumped by means of the shaft $d'$ and winch $d^2$ or other preferred means. Within the horizontal flue or oven $b$, at either end thereof, are located the driving-sprockets $e$ and $e'$, one of which, $e$, is driven by a shaft $e^2$, pulley $e^3$, and belt $e^4$ from the main driving-shaft $e^5$. Over the sprockets $e$ and $e'$ is adapted to travel an endless conveyer chain or band $f$ of any suitable construction and adapted to receive and carry the material to be treated. This conveyer is so arranged that on turning the sprocket $e$ it will discharge its contents into the muffle $d$, as indicated in Fig. 1. At that end of the flue opposite to where the conveyer $f$ discharges a suitable opening normally closed by doors $b'$ is provided for the purpose of discharging waste matter to the conveyer $f$. The flue or oven $b$ is separated by a partition or flooring $b^2$ into two horizontal compartments, in the lower one, $b^3$, of which the hot gases from the furnace A are conducted, and the empty portion of the conveyer $f$ travels in this lower compartment. In the upper compartment $b^4$, which by preference does not communicate with the lower compartment $b^3$, the filled portion of the conveyer travels from the doors $b'$ until the conveyer discharges into the muffle or tilting hopper $d$. The lower compartment $b^3$ discharges into a stack or chimney B. Within this chimney B and at or near its upper end is provided a rose or sprayer $B'$, arranged to discharge against the inner walls of the stack B a thin film or spray of water to protect the same from the corrosive action of certain waste gases arising from treated matter which may be discharged to the stack. The sprayer $B'$ also serves to collect and precipitate certain chemicals into the waste and flue gases which precipitates, and liquid from the sprayer may be drawn off from the base of the stack through the pipe $B^2$. The sprayer also prevents in a large measure the escape from the stack of various stenches arising from the treatment of the waste matter. Above the tilting hopper or muffle $d$ is formed a hood or pocket $d^4$ of the upper compartment $b^4$. This hood $d^4$ is connected by one or more pipes $h$ with a pipe $h'$, leading to the fire-chamber $a$. These pipes $h$ are furnished with valves $h^2$, which when open permit of the escape of gases, &c., into the hood or pocket $d^4$ to the furnace for consumption therein. The upper compartment $b^4$ also communicates, by means of the pipes $e^7$, with one or more saturators D. These saturators consist, preferably, of a tank $m$, lined with lead or other suitable material and partially filled with sulfuric acid. Suspended within the tank $m$ is a bell $m'$, the mouth of which is submerged in the acid. The bell by preference is made of lead or other similar material. Into the bell $m'$ extends a pipe $i$, being the continuation of the pipe $e^7$, the perforated open end $f'$ of which extends into sulfuric acid. From the upper end of the bell $m$ extends a pipe $n$, leading to the lower flue-compartment $b^3$, and hence to the stack B. In the drawings are illustrated two flues side by side, in each of which a separate conveyer $f$ is located. Either or both of these flues may be used, and the pipe $n$, which leads to the lower compartments $b^3$ of both flues, as illustrated in Fig. 4, is provided with valves $n^2$ and $n^3$, either of which may be closed to prevent communication with the flue not in use and the saturators D.

The operation of the apparatus illustrated and described is as follows: The conveyer $f$ receives the waste matter below the doors $b'$ and conveys it slowly through the flue or oven $b$, which is highly heated by the gases in the flue-compartment $b^3$. The matter by the time it reaches the furnace end of the flue or oven is completely dried and charred or coked. During its travel in the oven the gases and vapors driven off may be disposed of in one or two ways, namely: They may escape when the valves $e^6$ are closed and only the valves $h^2$ are open from the hood $d^4$ directly to the pipe $h'$, from which they are fed into the furnace A, or when the valves $e^6$ are open the vapors and gases are first conducted through the saturator D, in which the available ammoniates are precipitated and from which the waste may be fed to the stack through the flue-compartment $b^8$. In this latter case if the valves $h^2$ are open some of the gases arising from the compartment $b^4$ in the hood $d^4$ may escape to the furnace.

The disposition of the gases and vapors will depend largely upon the character of the waste matter to be treated. If rich in ammoniacal products in the form of a gas and ammoniacal vapors, such should be passed through the saturators, so that the sulfuric acid may precipitate white crystals, known as "sulfate of ammonia." When, however, the matter is neither rich in hydrogen nor ammoniacal vapors or gas, it may be advisable to discharge these vapors or gases to the stack B.

Having thus described the nature and objects of my invention, what I claim as new, and desire to secure by Letters Patent, is—

The combination of a furnace provided with an oven having a series of flues, into which flues is adapted to be introduced solid or substantially solid matter, suitable conveyers adapted to travel therein and the gas or vapors arising from the treatment of said matter adapted to be conducted by means of a pipe connection $n$, provided with valves $n^2$ and $n^3$, to a saturator or saturators containing sulfuric acid, a bell suspended in a body of sulfuric acid in each of said saturators, an outlet-pipe extending through the bell of each of said saturators and perforated below the surface of said body of sulfuric acid, and each of said pipes connected with a flue of said oven, substantially as and for the purposes specified.

In testimony whereof I have hereunto set my signature in the presence of two subscribing witnesses.

WINFIELD S. RICHARDSON.

Witnesses:
J. WALTER DOUGLASS,
THOMAS M. SMITH.